United States Patent
Endo et al.

(10) Patent No.: US 10,090,085 B2
(45) Date of Patent: Oct. 2, 2018

(54) VARISTOR AND PRODUCTION METHOD THEREOF

(71) Applicant: HITACHI CRITICAL FACILITIES PROTECTION PTE. LTD., Singapore (SG)

(72) Inventors: Yoshishige Endo, Singapore (SG); Chee Yeong Andrew Mui, Singapore (SG); Koji Fukuta, Singapore (SG)

(73) Assignee: HITACHI CRITICAL FACILITIES PROTECTION PTE. LTD., Singapore (SG)

( * ) Notice: Subject to any disclaimer, the term of this patent is extended or adjusted under 35 U.S.C. 154(b) by 0 days.

(21) Appl. No.: 15/551,485

(22) PCT Filed: Feb. 15, 2016

(86) PCT No.: PCT/SG2016/050076
§ 371 (c)(1),
(2) Date: Aug. 16, 2017

(87) PCT Pub. No.: WO2016/133460
PCT Pub. Date: Aug. 25, 2016

(65) Prior Publication Data
US 2018/0061535 A1 Mar. 1, 2018

(30) Foreign Application Priority Data

Feb. 17, 2015 (SG) .............................. 10201501241P

(51) Int. Cl.
*H01C 7/10* (2006.01)
*H01C 7/112* (2006.01)
(Continued)

(52) U.S. Cl.
CPC ............... *H01C 7/112* (2013.01); *C09D 7/12* (2013.01); *C09D 7/40* (2018.01); *H01B 3/40* (2013.01); *H01C 7/123* (2013.01)

(58) Field of Classification Search
CPC ................................ H01C 7/112; H01C 7/123
(Continued)

(56) References Cited

U.S. PATENT DOCUMENTS

| 4,959,262 A | 9/1990 | Charles et al. |
| 7,558,520 B2 * | 7/2009 | Sugawara .......... G03G 15/2057 399/333 |

(Continued)

FOREIGN PATENT DOCUMENTS

| EP | 1975949 A1 | 10/2008 |
| EP | 2947125 A1 | 11/2015 |

(Continued)

OTHER PUBLICATIONS

International Search Report and Written Opinion of the ISA for PCT/SG2016/050076; ISA/SG, Singapore, dated Mar. 21, 2016.
(Continued)

*Primary Examiner* — Kyung Lee
(74) *Attorney, Agent, or Firm* — Harness, Dickey & Pierce, P.L.C.

(57) ABSTRACT

The present invention relates to a product and fabrication method for a varistor comprising a solid phase of zinc oxide particles substantially uniformly dispersed within a resin media. The varistor of the present invention is synthesized by mixing a substantially homogenous mixture of solid zinc oxide particles and a resin media, and heating the mixture under conditions to melt the resin and suspend the solid zinc oxide particles therein.

18 Claims, 11 Drawing Sheets

(51) Int. Cl.
*H01B 3/40* (2006.01)
*C09D 7/12* (2006.01)
*H01C 7/12* (2006.01)
*C09D 7/40* (2018.01)

(58) Field of Classification Search
USPC .................................................... 338/20, 13
See application file for complete search history.

(56) References Cited

U.S. PATENT DOCUMENTS

| | | | |
|---|---|---|---|
| 7,981,325 B2* | 7/2011 | Kosowsky | B82Y 10/00 252/511 |
| 8,044,761 B2* | 10/2011 | Yanagida | H01C 7/102 252/519.51 |
| 8,216,544 B2* | 7/2012 | Ando | H01B 1/08 333/223 |
| 2006/0014021 A1* | 1/2006 | Sugawara | G03G 15/2057 428/421 |
| 2009/0160600 A1* | 6/2009 | Yanagida | H01C 7/102 338/21 |
| 2010/0136337 A1* | 6/2010 | Ando | H01B 1/08 428/402 |
| 2010/0141376 A1* | 6/2010 | Kosowsky | B82Y 10/00 338/20 |

FOREIGN PATENT DOCUMENTS

WO WO-2008/054308 A1 5/2008
WO WO-2014/112384 A1 7/2014

OTHER PUBLICATIONS

International Preliminary Report on Patentability (Ch. II) for PCT/SG2016/050076, IPEA/SG, Singapore, dated Dec. 12, 2016.

* cited by examiner

Varistor Voltage: $V_c \propto H/t \times V_e$

Withstand Current: $I_c \propto D^2 / d^2 \times i_s$

| Sample | Image | Dimensions | DC clamping voltage @ 1mA | Impulse clamping voltage @ 8/20 µs | Surge withstand capability until failure (Impulse 1.2/50 µs; 8/20 µs combination wave) | Reliability (No. of continuous pulses withstood until failure @ 4kV) | Total number of surge withstand capability (Impulse 1.2/50 µs; 8/20 µs combination wave) |
|---|---|---|---|---|---|---|---|
| Littelfuse V251HB34 |  | Length: 37 mm Width: 37 mm Thickness: 2.5 mm | 418 $V_{DC}$ | 1000 $V_{imp}$ | 4000 V | 1st | 6 |
| pMOV Sample |  | Diameter: 11 mm Thickness: 1 mm | 395.2 $V_{DC}$ | 900 $V_{imp}$ | 6000 V** | 10th | 53 |

FIG. 11

VARISTOR AND PRODUCTION METHOD THEREOF

CROSS-REFERENCE TO RELATED APPLICATIONS

This application is a 371 U.S. National Stage of International Application No. PCT/SG2016/050076, filed Feb. 15, 2016. This application claims the benefit of and priority to Singapore Patent Application No. 10201501241P, filed Feb. 17, 2015. The disclosures of the above applications are incorporated herein by reference.

TECHNICAL FIELD

The present invention generally relates to a varistor and to a method of fabricating such a varistor.

BACKGROUND

The most common type of varistor the metal-oxide varistor (MOV). Conventionally, a MOV contains a ceramic mass of zinc oxide (ZnO) grains in a matrix of other inorganic oxides such as small amounts of bismuth, cobalt, chromium and/or manganese sandwiched between two metal plates which act as the electrodes. The other inorganic oxides to be added to the ZnO generally have a lower melting point than ZnO, and act as a sintering additive during the sintering step when the MOV is formed.

Further, the presence of the other inorganic oxide additives is also known to affect the non-linear current-voltage characteristics of the varistor. More specifically, the type and combination of the other inorganic oxide additives used affect not only the non-linear current-voltage characteristics of the varistor, but also the sintering temperature and sintering time required to form the varistor.

Following the sintering of a conventional varistor, the varistor comprises ZnO crystal grains having a diameter of between about 10 µm to about 150 µm encapsulated by a grain boundary layer substantially consisting of other inorganic oxide additives. The non-linear electrical behavior occurs at the boundary of each ZnO crystal grain. Without being bound by theory, it is believed that the non-linear current-voltage characteristics of a varistor are dependent on the type and thickness of this grain boundary layer.

Table 1 shows how various other inorganic oxide additives affect the non-linear resistance and the non-linear coefficient ($\alpha$). The larger the value of $\alpha$, the higher the non-linear resistance property of the varistor. As shown in the table, if there is only one other inorganic oxide additive, the value of $\alpha$ is small, but when a combination of five inorganic oxide additives are used, $\alpha=50$. As such, there have traditionally been many variables that can affect the properties of varistors, making it difficult to obtain varistors that have a consistent quality in performance. In addition, as the components of the varistor are ceramic, the method of forming a conventional varistor has traditionally been very complex, requiring, for example, sintering of the product at very high (approximately 1000° C.) temperatures, which often lead to instability in the varistor performance due to formation of pores. Furthermore, due to the complex process, it is difficult to maintain crystal grains of uniform size.

TABLE 1

Electrical properties and average grain size of ZnO ceramics with various combined additives

| Additive (mol %) | Sintering temperature (° C.) | Non-linear resistance (V/mm) | Nonlinear exponent, $\alpha$ | Average grain size (µm) |
| --- | --- | --- | --- | --- |
| $Bi_2O_3$ (0.5) | 1150 | 10 | 4.0 | 20 |
| $Sb_2O_3$ (0.5) | 1150 | 65 | 3.1 | 3 |
| $Bi_2O_3$ (0.5) $CoO$ (0.5) | 1250 | 65 | 3.1 | 25 |
| $Bi_2O_3$ (0.5) $MnO$ (0.5) | 1350 | 50 | 18 | 30 |
| $Bi_2O_3$ (0.5) $CoO$ (0.5) $MnO$ (0.5) | 1350 | 50 | 18 | 30 |
| $Bi_2O_3$ (0.5) $CoO$ (0.5) $MnO$ (0.5) $Cr_2O_3$ (0.5) | 1250 | 48 | 21 | 20 |
| $Bi_2O_3$ (0.5) $CoO$ (0.5) $MnO$ (0.5) $Cr_2O_3$ (0.5) $Sb_2O_3$ (0.5) | 1350 | 135 | 50 | 10 |

There is therefore a need to provide a varistor which overcomes, or at least partially ameliorates, one or more of the disadvantages described above.

SUMMARY

In a first aspect, there is provided a varistor comprising a solid phase of zinc oxide particles substantially uniformly dispersed within a resin media, wherein the zinc oxide is present in the varistor in a range of 50 vol % to 80 vol % and wherein the ZnO or the varistor has not been sintered.

As the zinc oxide particles are substantially uniformly dispersed within the resin media, the dispersion may be substantially homogeneous. In some disclosed embodiments, the zinc oxide particles are of a substantially uniform particle size. Advantageously, a uniform dispersion and particles of substantially uniform size, enable efficient packing of zinc oxide particles within the resin media, thereby increasing the amount of particle grain boundaries. As the non-linear electrical behavior occurs at the boundary of each grain, an increase in grain boundaries advantageously increases the non-linear characteristics of the varistor.

In disclosed embodiments, the varistor is substantially free of inorganic oxides other than zinc oxide. Advantageously, the disclosed varistor may not require additional additives and hence may be free of constituents other than zinc oxide and resin. More advantageously, as there may be a substantial or complete absence of inorganic oxides other than zinc oxide, the properties of the disclosed varistor may be easier to control.

In a second aspect, there is provided a method of fabricating a varistor, comprising: mixing a substantially homogeneous mixture of solid zinc oxide particles and a resin media, wherein the zinc oxide is present in the mixture in a range of 50 vol % to 80 vol %; and heating the mixture under conditions to melt the resin and suspend the solid zinc oxide particles therein; and wherein a step of sintering is not performed.

The disclosed method may comprise the step of selecting zinc oxide particles of a substantially uniform particle size to be mixed with the resin.

Advantageously, the disclosed method is simple and straightforward. Further advantageously, the disclosed method does not involve many variables and therefore can produce varistors that are consistent in quality and performance.

In embodiments, the disclosed method excludes the step of sintering the mixture to form the varistor. Advantageously, high temperatures associated with a sintering step are not required.

Definitions

The following words and terms used herein shall have the meaning indicated:

The term "other inorganic oxide" and "other inorganic oxide additives" may be used interchangeably and for the purposes of this application, refer to all inorganic oxides other than zinc oxide (ZnO).

The term "zinc oxide (ZnO) grain", for the purposes of this disclosure, refers to ZnO in the varistor mixture of sintered MOVs.

The term "zinc oxide (ZnO) particle", for the purposes of this disclosure, refers to ZnO in the varistor mixture of non-sintered pMOVs.

The term "sintering" in reference to the fabrication of the varistor, refers to the process where powders are fused together at temperatures and/or pressures that are high but below the point of liquefaction of the material in the powder. The process is characterized by atoms or molecules in the powder particles diffusing across the boundaries of the particles, fusing the particles together and creating one solid piece. Sintering controls the densification and grain growth of a material.

The term "densification" refers to the act of reducing the porosity of a material thereby increasing its density.

The term "grain-growth" refers to the increase in size of crystal grains (crystallites) in a material at high temperature.

The term "mold" as used herein is intended to encompass all forms of shaping members wherein the material to be shaped can be introduced by pouring or injection with or without the aid of pressure. The term "molding" should be construed accordingly.

The word "substantially" does not exclude "completely" e.g. a composition which is "substantially free" from Y may be completely free from Y. The term "substantially free" from Y is also intended to include a composition with small amounts of Y which does not materially affect the composition or alter the properties of the composition. The term "substantially free" in reference to inorganic oxides other than zinc oxide refers to an amount which is less than about 0.1 vol %. Where necessary, the word "substantially" may be omitted from the definition of the invention.

The term "substantially uniformly dispersed" and variants thereof as used herein refers to the variation in population density (e.g. particle distribution) of the zinc oxide particles within a unit volume of resin media being less than about ±20%, less than about ±10%, or less than about ±5%. The variation in population density of the dispersed zinc oxide particles in the resin, and in the final varistor product, can be quantified by known analytical techniques. For example, a sample of the extrudate is analysed to determine whether the percent of zinc oxide particles have computed sizes which are within the ranges set forth herein below concerning particle size. Another method is to place a sample of the dispersion over a light source of appropriate wavelength and intensity to enable one to quantify the number of particles which show up as "imperfections"; and the size of each is also visible under appropriate magnification. Another method is to use Digital Microscope VHX (Keyence) to measure a sample for the particle diameter and uniformity in dispersion.

The term "substantially homogeneous" as used herein refers to particles which are generally evenly dispersed within the mixture or dispersion without substantial agglomeration within the resin media or separation from the resin media.

The term "uniform" in relation to particle size generally refers to a particle size distribution wherein more than about 80% of particles have a predetermined size range, e.g. a size range of about 1 to 50 μm. The particle size may refer to the diameter of the particles where they are substantially spherical. The particles may be non-spherical and the particle size range may refer to the equivalent diameter of the particles relative to spherical particles or may refer to a dimension (length, breadth, height or thickness) of the non-spherical particle.

Unless specified otherwise, the terms "comprising" and "comprise", and grammatical variants thereof, are intended to represent "open" or "inclusive" language such that they include recited elements but also permit inclusion of additional, unrecited elements.

As used herein, the terms "about" and "approximately", in the context of concentrations of components of the formulations, or where applicable, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 11 is a chart comparing the electrical properties of the varistor according to an embodiment of the present application and a conventional ceramic varistor.

DISCLOSURE OF OPTIONAL EMBODIMENTS

Conventionally, a varistor is an element for protecting devices from high electrical surges such as voltage or current spikes originating from events such as, for example, from lightning strikes, tripped circuit breakers, electromagnetic pulses and inductive spikes to name a few. Depending on the withstand voltage of the device to be protected, as well as the type and extent of the electrical surge, different varistors can be selected for use. Electrical surges can enter from various points such as electrical power lines, signal lines and lightning rods. Sometimes, electrical surges that occur from static electricity must also be considered.

If, for example, the working voltage of a circuit is 200 V and the withstand voltage of the device to be protected is 400 V, then the varistor to be connected in parallel to the device should ideally have a varistor voltage (also known as the clamping voltage, Vc) selected from the range: 200 V×√2<Vc<400 V.

Figure 1:
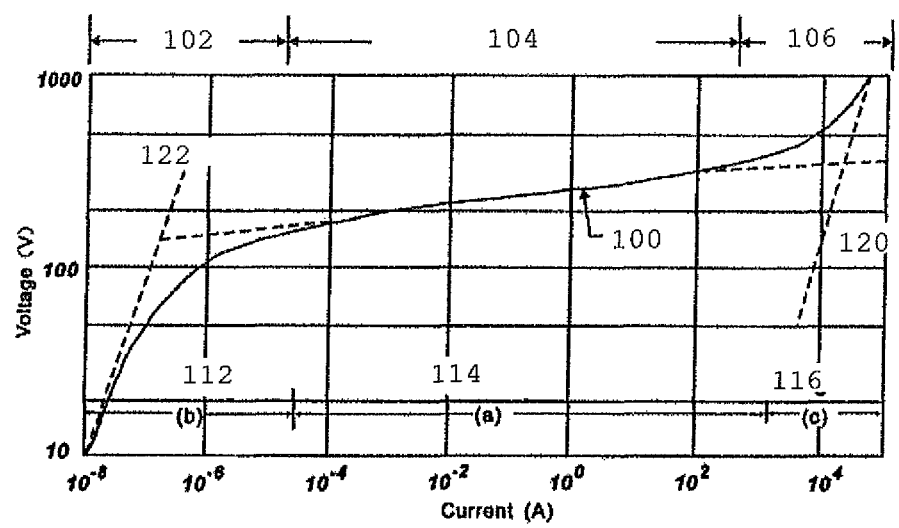
FIG. 1 is a graph showing the voltage-current characteristics of a varistor.

FIG. 1 describes the range for Normal Varistor Operation. It shows the leakage region 102, normal varistor operation 104 and upturn region 106. It also describes the low α region (b) 112, varistor action region (a) 114 and the low α region (c) 116.

In a varistor, it is preferable that the non-linear resistance property is such that the range for Normal Varistor Operation as shown in FIG. 1 is broad, and that the graph 100 is flat in this range. The graph in FIG. 1 is described by the equation $I=KV^\alpha$, and the larger the value of α in the equation, the flatter the line will be.

Figure 2:
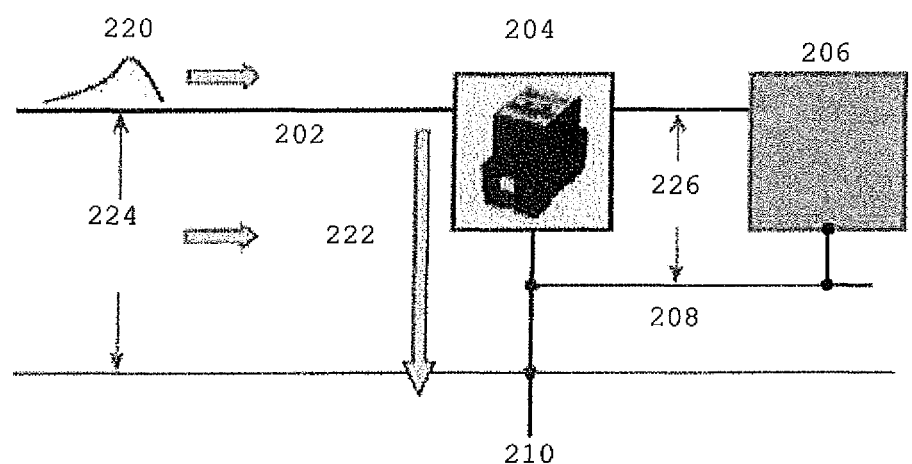
FIG. 2 is a diagram showing how a varistor is typically connected within a circuit.

Another important property for a varistor is its allowable current. As shown in the current-voltage characteristics described by FIG. 1, when the voltage reaches a certain threshold, the varistor's resistive properties begin to behave similarly to that when it is in the lower voltage region. That is, the resistive properties of the varistor go from non-linear to linear. If a lightning surge is applied and the voltage goes beyond the transition region (i.e. low α region (c) 116 in FIG. 1), then the varistor itself will become damaged. Conventionally, as shown in FIG. 2, the varistor is connected in parallel to the device to be protected. FIG. 2 shows the power line 202, the varistor 204, the electric device 206, the earth 208 and the ground connection 210, as well as the lightning surge 220, the lightning current 222, the lightning surge voltage 224 and the restriction of current 226. If the varistor 204 is damaged and the electrical circuit becomes open, the surge 220 will also apply to the device 206, and the device 206 will also become destroyed. Therefore, a broad region of non-linear resistive properties is required.

The disclosed varistor is a plastic MOV (pMOV), wherein the ZnO is mixed with a resin. In an embodiment, the disclosed varistor comprises a solid phase of zinc oxide particles substantially uniformly dispersed within a resin media.

The pMOV has superior properties compared to conventional ceramic varistors. Without being bound to theory, it is thought that conventional varistors which require addition of a sintering additive and subsequent sintering to form the varistor are not as effective as pMOVs because during the sintering process, the sintered body itself acts as a large particle that form layers akin to grain boundaries. These layers may act as air space, or pores, which in turn affect the insulating properties of the varistor. In contrast, if sintering additives are not used, and the mixture is not sintered, the ZnO particles are brought close to each other in its pure powder form and are not affected by air spaces. This results in pMOVs having better insulating properties than conventional varistors.

Figure 3A:
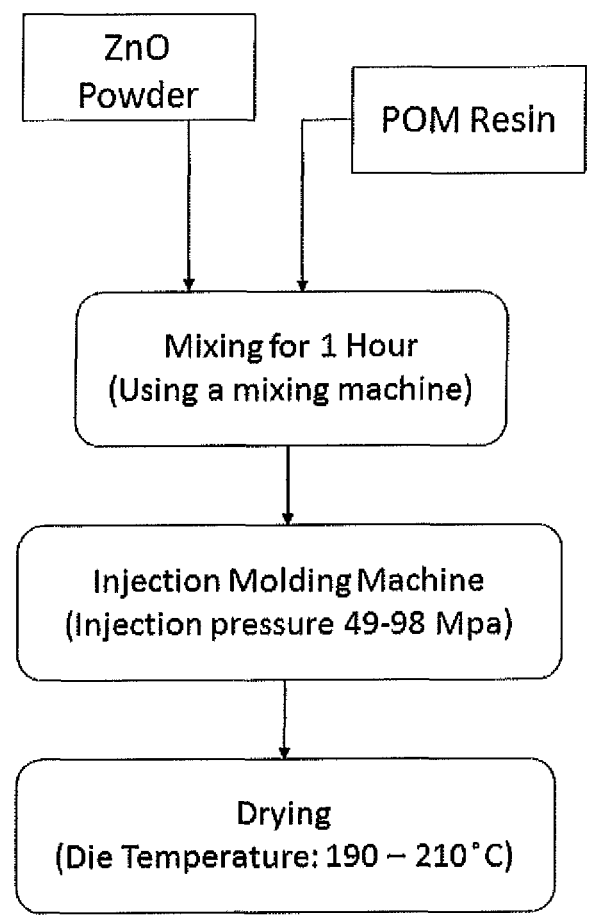
FIG. 3A is a flow chart showing the method of fabrication according to an embodiment of the present application.
Figure 3B:
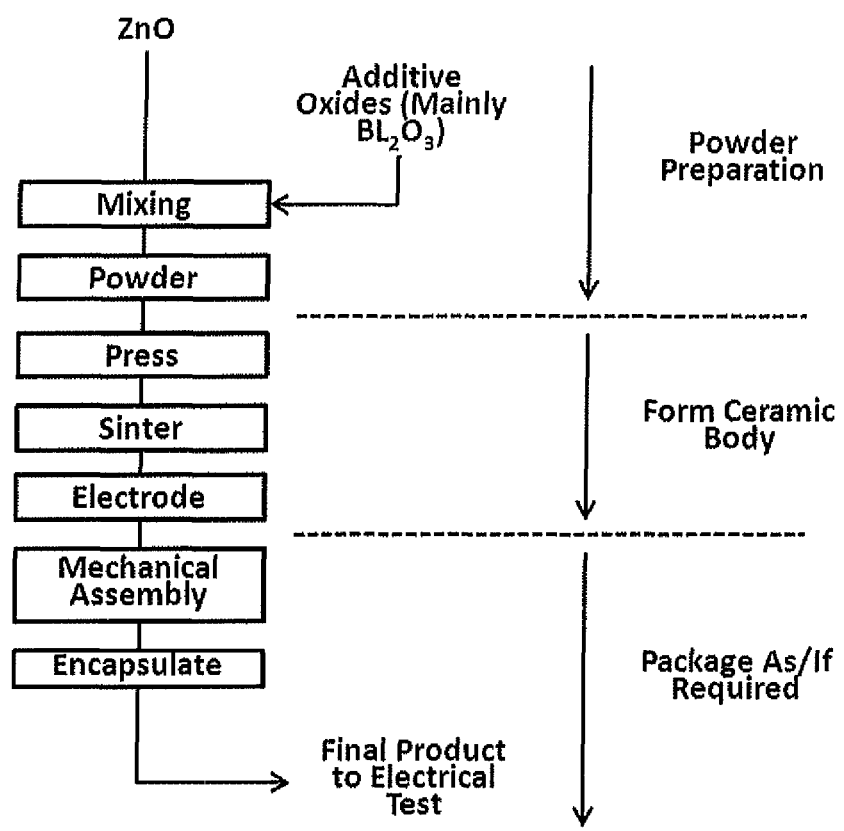
FIG. 3B is a flow chart showing the method of fabrication of a conventional ceramic varistor.

FIG. 3A and FIG. 3B are flow charts showing some of the steps involved in forming a pMOV and a conventional ceramic varistor, respectively. FIG. 3A shows a flow chart for the formation of an embodiment of the present invention. FIG. 3B shows a flow chart for the formation of a conventional ceramic varistor. It can be seen that compared to the conventional method described in FIG. 3B, the method for forming the varistor of the present application as described in FIG. 3A is very simple and uncomplicated.

Figure 4:
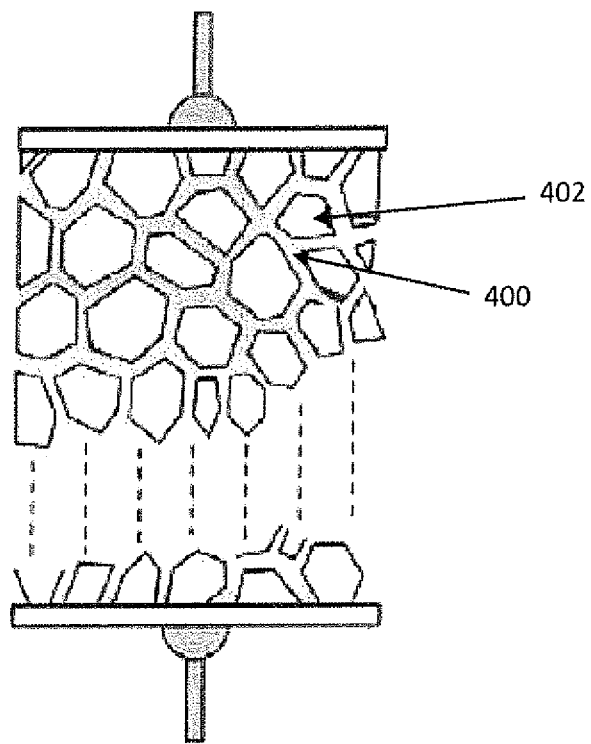
FIG. 4 is micrographic image of the grains and grain boundaries in a conventional ceramic varistor. The image was taken from M. Matsuoka et al., ZnO Varistor, Ohmsha Ltd., 2009.

The most common way to make conventional ceramic varistors is to add other inorganic oxide additives such as $Bi_2O_3$, $Sb_2O_3$, CoO, MnO, $Cr_2O_3$, or any combination thereof, to the ZnO and to sinter the mixture at a temperature about 1000° C. For a conventional ceramic varistor, the ZnO starting material is usually a few μm in size, but after sintering, the grain size 402 increases to between about 10 μm to about 150 μm, as shown in FIG. 4. The increase in grain size 402 depends on the type of other inorganic oxide additive present, the temperature and duration of the sintering step. In addition, a grain boundary layer 400 comprising the other inorganic oxide additives is formed around the ZnO crystal grain 402. As it can be seen from FIG. 4, it is very difficult to control the size of the ZnO crystal grain 402 or the thickness of the grain boundary 400 in a conventional ceramic varistor, even though these factors determine the electrical properties of the varistor.

Further, during formation of a ceramic material by sintering at relatively high temperatures, many pores form within the sintered body. These pores form during the sintering process and its formation is difficult to control. Further, these pores are electrically unstable, and can cause breakdown or expansion which leads to destruction or defects in the varistor product.

In the case of conventional ceramic varistors, the ZnO grain crystals act as semi-conductors and the grain boundaries act as insulators, but when a voltage that is larger than what is prescribed is applied, the insulation afforded by the insulating layer is overcome due to a tunneling effect and an electric current begins to flow.

In contrast, for pMOV, a simple and uncomplicated method of forming can be employed, whereby the main ingredients of the varistor, the ZnO and the resin, are mixed together at a temperature suitable for injection molding, then injection molded to form the varistor. More particularly, the ZnO powder or the ZnO crystal particles having a particular size are simply mixed with the resin to form the varistor. By this method, the shape and size of the ZnO particle starting material are maintained during the formation of the varistor. This is unlike the ZnO particle size in conventional ceramic varistors, whereby during the sintering step, the ZnO particle size increases. Further, during the synthesis of pMOVs, if the mixing step is optimized, very little pores are formed. This is again, unlike conventional ceramic varistors, whereby during the sintering step, numerous pores are formed.

In pMOVs, the resin acts as the grain boundary equivalent of a conventional ceramic varistor. That is, it acts as a high-resistance insulating layer. The resin also acts as a binder for the ZnO particles. In pMOVs, it is possible to determine the electrical property per unit volume of the varistor by simply altering the shape or size (particle diameter) of the ZnO powder starting material and its blending ratio with the resin by volume. For example, if the particle diameter of ZnO is 20 μm and the particles are encapsulated in a layer of polyacetal resin such that the compact has a board thickness of 1 mm, Vc=1000/20×3 eV (energy level of ZnO)=150 V if the particles are ideally ordered.

Illustrative, non-limiting embodiments of a varistor will now be disclosed.

The zinc oxide (ZnO) may be from a pure or substantially pure source. The source of ZnO may be substantially free or completely free of impurities. The source of ZnO may comprise less than about about 0.01%, about 0.05%, about 0.1%, about 0.2%, about 0.5% or about 1% of impurities. The source of ZnO may comprise less than about 0.1% of impurities.

The ZnO may be crystalline. The ZnO may be polycrystalline. The ZnO may be in the form of crystallites. The ZnO may be in the form of a powder. The ZnO may be in the form of particles. The ZnO may be in the form of particles. The ZnO may be in the form of crystal particles.

The ZnO may be of substantially uniform size. The size of the zinc oxide (ZnO) particles may be in the range of about 1 μm to about 50 μm, about 1 μm to about 20 μm, about 1 μm to about 5 μm, about 1 μm to about 10 μm, about 1 μm to about 15 μm, about 5 μm to about 20 μm, about 5 μm to about 10 μm, about 5 μm to about 15 μm, about 10 μm to about 15 μm, about 10 μm to about 20 μm or about 15 μm to about 20 μm. The size of the zinc oxide (ZnO) particles may be in the range of about 5 μm to about 50 μm.

The ZnO particles may advantageously have a narrow particle size distribution. The ZnO particles may have a particle size distribution wherein more than about 80%, or more than about 85%, or more than about 90%, or more than about 95%, or more than about 96%, or more than about 97%, or more than about 98%, or more than about 99% of particles have a size of between about 1 μm to about 50 μam.

If the zinc oxide (ZnO) particles are too small (for example, less than 1 μm), then the particles may aggregate, decreasing the efficiency of the varistor when mixed with the resin. If the ZnO particles are too large (for example, greater than 50 μm), then the particles may break up during the mixing step, causing the ZnO particles to no longer be substantially uniform in size within the mixture, consequently decreasing the efficiency of the varistor.

The zinc oxide (ZnO) particles may be substantially uniformly dispersed within the resin. The zinc oxide (ZnO) particles may be homogeneously dispersed within the resin. If the zinc oxide (ZnO) particles are not uniformly dispersed in the resin, the variation of the varistor voltage may increase, causing the varistor to have unpredictable properties. The unpredictability of the varistor property may decrease cost-efficiency and time-efficiency in production of the varistor, making it unsuitable for commercialization. For instance, the variation of the varistor voltage may increase with a change in varistor thickness, thereby resulting in unpredictability of the varistor property during production.

A particularly important property of the varistor that may be affected by the homogeneity of the zinc oxide (ZnO) dispersed in the resin is clamping voltage. The homogeneity of the zinc oxide (ZnO) particles in the resin may affect the clamping voltage of the varistor product. If the clamping voltage of the varistor product is too high (higher than specified in the present application), the varistor may not be able to protect the electrical devices or electronic devices to be protected in an event that a surge occurs. In contrast, if the clamping voltage is too low, then it is likely to be destroyed due to constant current leakage under rated voltage from the power lines. As such, it may be advantageous for the zinc oxide (ZnO) particles to be substantially uniformly dispersed within the resin in order to ensure that the varistor has consistent properties such as clamping voltage.

The varistor may be substantially free of inorganic oxides other than zinc oxide (ZnO). Other inorganic oxides may be metal oxides other than ZnO. Other inorganic oxides may include, but are not limited to $Bi_2O_3$, $Sb_2O_3$, CoO, MnO, $Cr_2O_3$, NiO, or any combination thereof, other than ZnO.

The disclosed varistor is free of any ceramic material. The disclosed varistor is not a ceramic material.

The resin may be a polymer. The resin may be any polymer that has suitable properties for use in a varistor. The polymer may have suitable mechanical, electrical and thermal properties for use in a varistor. The resin may be a thermoplastic polymer. Thermoplastic polymers are preferred over thermosetting plastic polymers as they have superior moulding properties. In particular, they are more suited for injection moulding methods where the heated molten resin is moulded under pressure.

Preferably, the resin may comprise a polyether structure having methylene groups ($—CH_2—$) and ether groups ($—O—$). More preferably, the resin may be selected from the group consisting of polystyrene, polyethylene, polypropylene, polyacetal, polymethyl acrylate, polycarbonate, polyamide, polytetrafluoroethylene, tetrafluoroethylene, perfluoroalkoxyethylene and any mixture thereof. These thermoplastic polymers may have ideal electrical, thermal and/or mechanical properties for use in a varistor. Of these, polyacetal has superior resistance to heat-deformation at high temperatures, that is, it has superior resistance to creep at high temperatures, making it ideal for use in a varistor.

The zinc oxide may be present in the varistor in a range of about 50 vol % to about 80 vol %, about 50 vol % to about 55 vol %, about 50 vol % to about 60 vol %, about 50 vol % to about 65 vol %, about 50 vol % to about 70 vol %, about 50 vol % to about 75 vol %, about 55 vol % to about 60 vol %, about 55 vol % to about 65 vol %, about 55 vol % to about 70 vol %, about 55 vol % to about 75 vol %, about 55 vol % to about 80 vol %, about 60 vol % to about 65 vol %, about 60 vol % to about 65 vol %, about 60 vol % to about 70 vol %, about 60 vol % to about 75 vol %, about 60 vol % to about 80 vol %, about 65 vol % to about 70 vol %, about 65 vol % to about 75 vol %, about 65 vol % to about 80 vol %, about 70 vol % to about 75 vol %, about 70 vol % to about 80 vol % or about 75 vol % to about 80 vol %, with the remaining volume being composed of the resin.

In an embodiment, the zinc oxide is present in the varistor in a range of about 65 vol % to about 70 vol % to optimize the packing of zinc oxide particles within the resin media. In another embodiment, the zinc oxide is present in the varistor at about 65 vol % to optimize the packing of zinc oxide particles within the resin media.

If the amount of zinc oxide present in the varistor is too low (for example, less than about 50 vol %) or too high (for example, more than about 80 vol %), the packing of zinc oxide particles may not be optimal, resulting in less uniformity in the dispersion of the zinc oxide in the resin. Without being bound to theory, ZnO particles may occupy 75% of space in cubic of resin if it is ideally spheroidal and uniform, but may occupy up to 80% of space if it is less spheroidal or less uniform. A lower homogeneity of the zinc oxide dispersed in the resin may result in unpredictable properties of the varistor produced.

Figure 5:
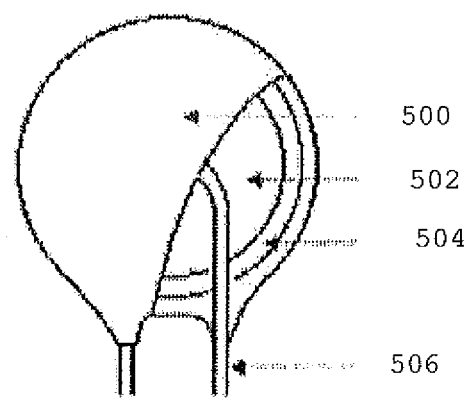
FIG. 5 is a schematic diagram of a varistor product according to an embodiment of the present application.

The variation of varistor voltage may be less than about 20%, less than about 10%, or less than about 5%, when varistors are formed from a uniform dispersion of zinc oxide within the resin. In an embodiment, the variation of varistor voltage may be less than about 5% when the thickness of the varistor is changed. In an embodiment, when 65 vol % of zinc oxide is present in the resin, the variation of varistor voltage may be less than about 5% when the thickness of the varistor is changed. The varistor may take on various shapes and sizes depending on its purpose and where it is to be used. An example of a varistor is shown in FIG. 5 comprising electrodes 502 on either face of a disc shaped varistor. FIG. 5 shows the coating 500, electrode 502, disc body 504 and lead 506. An alternative shape a varistor can take may be a box cell shape.

The varistor may have a thickness in the range of about 0.1 mm to about 5 mm, about 0.1 mm to about 0.5 mm, about 0.1 mm to about 1 mm, about 0.1 mm to about 1.5 mm, about 0.1 mm to about 2 mm, about 0.5 mm to about 1 mm, about 0.5 mm to about 1.5 mm, about 0.5 mm to about 2 mm, about 0.5 mm to about 5 mm, about 1 mm to about 1.5 mm, about 1 mm to about 2 mm, about 1 mm to about 5 mm, about 1.5 mm to about 2 mm, about 1.5 mm to about 5 mm or about 2 mm to about 5 mm.

The varistor may further comprise at least one metal electrode in contact with at least one surface of the mixture. The varistor may further comprise a pair of metal electrodes in contact with both surfaces of the mixture. The varistor may further comprise two electrodes, each in contact with two surfaces of the mixture. As shown in FIG. 5, if the varistor is disc shaped, then each of the two electrodes will be in contact with either face of the disc. The electrode may comprise, but are not limited to, silver, tin, nickel or any mixtures thereof. The electrode may have a length of about 10 mm, about 20 mm or about 30 mm. The electrode may have a length of about 20 mm. The electrode may have a diameter of about 0.5 mm, about 0.8 mm, or about 1.0 mm. The electrode may have a diameter of about 0.8 mm.

The electrode may be attached to the varistor mixture using an electrically conductive epoxy resin.

The varistor may further comprise a coating applied to the surface of the mixture. The coating may be applied to protect the varistor. The coating may comprise an insulating polymer. The coating may comprise epoxy resin. The coating may have a thickness of about 0.3 mm, about 0.5 mm or about 0.7 mm. The coating may have a thickness of about 0.5 mm.

The varistor may be capable of withstanding a surge voltage of at least 4500 V, at least 5000 V, at least 5500 V, at least 6000 V, at least 6500 V or at least 7000 V.

The varistor may have a porosity of less than 5%, less than 4%, less than 3%, less than 2%, less than 1%, less than 0.5% or less than 0.3%. Advantageously, the low porosity imparts to the disclosed varistor better insulating properties and better non-linear resistive properties than conventional varistors. Further advantageously, the low porosity decreases the likelihood breakdown or expansion. The disclosed varistor is therefore a more stable product than conventional varistors.

Illustrative, non-limiting embodiments of a method of fabricating a varistor will now be disclosed.

A method of fabricating a varistor may comprise mixing a substantially homogenous mixture of solid zinc oxide particles and a resin media. The method may comprise heating the mixture under conditions to melt the resin and suspend the solid zinc oxide particles therein.

The method may further comprise the step of providing zinc oxide (ZnO) and a resin. The method may comprise the step of selecting zinc oxide particles of a substantially uniform particle size to be mixed with the resin.

The mixing step may be conducted under conditions to substantially uniformly disperse the solid phase of zinc oxide particles within the resin media. The mixing step may comprise any process that mixes and works the mixture into a uniform mass. It is to be noted that any mixing method known to the skilled person may be used as long as it fulfills the function of mixing the ZnO with the resin. The mixing step may be performed using a mixing machine. The mixing step may comprise kneading. Kneading may be performed using a kneader reactor. The zinc oxide (ZnO) particles may be mixed with a thermoplastic resin such as polyacetal and molded to form the varistor product.

The mixing step may result in the mixture to be homogeneous.

The heating step may be conducted simultaneously, before or after the mixing step. The heating step may be conducted at a temperature that is suitable for mixing the ZnO and the resin. The heating step may be performed at a temperature that reduces the viscosity of the resin. The heating step may be performed at a temperature that is substantially lower than temperatures associated with sintering. The heating step may be performed at a temperature that is about 50%, or about 60%, or about 70% lower than the point of liquefaction of the mixture.

The heating step may be conducted at a temperature in the range of about 100° C. to about 300° C., about 100° C. to about 150° C., about 100° C. to about 200° C., about 100° C. to about 250° C., about 150° C. to about 200° C., about 150° C. to about 250° C., about 150° C. to about 300° C., about 200° C. to about 250° C., about 200° C. to about 300° C. or about 250° C. to about 300° C.

The mixing and/or heating step may be performed for a duration sufficient to result in a substantially homogeneous mixture of solid zinc oxide particles and a resin media. The mixing step may be performed for a duration in the range of about 0.5 hours to about 2 hours, about 0.5 hours to about 1 hour, about 0.5 hours to about 1.5 hours, about 1 hour to about 1.5 hours, about 1 hour to about 2 hours or about 1.5 hours to about 2 hours.

In embodiments where the mixing step comprises kneading, the kneading may be performed at a kneading speed in the range of about 100 rpm to about 200 rpm, about 100 rpm to about 125 rpm, about 100 rpm to about 150 rpm, about 100 rpm to about 175 rpm, about 125 rpm to about 150 rpm, about 125 rpm to about 175 rpm, about 125 rpm to about 200 rpm, about 150 rpm to about 175 rpm, about 150 rpm to about 200 rpm or about 175 rpm to about 200 rpm.

The method of fabricating a varistor may further comprise a step of molding the mixture. The molding step may comprise any process that gives shape to the mixture. It is to be noted that any molding method known to the skilled person may be used as long as it fulfills the function of molding the ZnO and resin mixture into a varistor. The molding step may comprise injection molding. The injection molding step may comprise feeding the mixture into a heated barrel, mixing and forcing the mixture into a mold cavity, where it may cool and harden to the configuration of the cavity. The forcing may be performed using a ram or screw-type plunger. The injection molding may be performed by an injection molding machine.

The disclosed method may comprise pressing the mixture into a form of predetermined thickness in order to obtain a desired value of nominal voltage. The varistor voltage (Vc) of pMOVs may be controlled by the board thickness of the pMOV as long as the ZnO particle diameter is constant.

In embodiments, the method for fabricating the varistor does not include a step of sintering. The method may not require a sintering step at any point during the fabrication process. That is, the varistor may be synthesized in its entirety without any sintering steps. In particular, the ZnO may not need to be sintered before being mixed with the resin.

Because sintering is conventionally performed under high temperatures for a long duration of time, it can be expensive and time consuming to perform. The disclosed method may advantageously eliminate the step of sintering altogether, thereby simplifying the method of fabrication. Due to the simple nature of the method of fabrication, mass production of the disclosed varistor would be easier. Further, the quality of the varistors produced by the disclosed method would be better and more consistent compared to conventional ceramic varistors that require a sintering step.

Furthermore, as there may be no additional step of mixing and sintering the ZnO with other metal additives, the particle size of ZnO remains the same even after mixing and/or heating with the resin. Thus, the ZnO particle size may be substantially uniform. In addition, the ZnO particles may be substantially homogeneously distributed within the resin.

The disclosed method may further comprise solidifying the molten resin to form a solid phase of zinc oxide particles substantially uniformly dispersed within the rein media.

The difference in property between the pMOV and the conventional ceramic varistor may be due to the pMOV having very little pores. The amount of pores present in the pMOV may be less than 0.1 vol %, less than 0.2 vol %, less than 0.5 vol %, less than 0.7 vol % or less than 1 vol %. The amount of pores present in the pMOV may be less than 0.5 vol %. and due to the superior creep properties of the polyacetal resin.

If the ZnO particles are ideally arranged within a plane in an orderly manner, the number of current paths may proportionally depend on the number of ZnO particles within the plane. That is, the number of current paths would depend on the area of the horizontal plane of the compact.

The pMOV may have a high allowable current and large a value which may be due to the numerous current paths that exist, in addition to the fact that there are very little pores that make the performance of the varistor unstable, and the use of polyacetal resin that has superior creep properties.

The method of fabricating a varistor may further comprise a step of providing at least one electrode. The electroding step may comprise any process that provides at least one electrode to the varistor. The method of fabricating a varistor may further comprise a step of providing a pair of electrodes. The electroding step may comprise any process that provides a pair of electrodes. It is to be noted that any electroding method known to the skilled person may be used as long as it fulfills the function of providing at least one electrode to the varistor. The electroding step may be accomplished by means of thick film silver fired onto the varistor surface. Wire leads or strap terminals may then be soldered in place. An electrically conductive adhesive, such as epoxy, may be used to connect the leads to the varistor.

The disclosed method may comprise a step of applying a coating to the mixture. The coating step may comprise any process that packages or protects the zinc oxide and resin mixture. The coating step may comprise an encapsulation step. The coating may be of any suitable material that can protect the mixture. For example, plastic, epoxy or phenolic coatings can be used.

Although the invention has been described herein with reference to specific embodiments, many modifications and variations therein will readily occur to those skilled in the art. Accordingly, all such variations and modifications are included within the intended scope of the invention.

EXAMPLES

Non-limiting examples of the invention will be further described in greater detail by reference to specific Examples, which should not be construed as in any way limiting the scope of the invention.

Example 1: Formation of the pMOV

To form a pMOV, ZnO particles having an average diameter of 20 μm was mixed with polyacetal resin at a 65% blending ratio by volume of resin. The mixing step was performed in a kneader machine (Laboratory Kneader TDR100-3, Toshin (Japan)). The mixture was subsequently heated and mixed at 200° C. and molded into a varistor having a board thickness of 1 mm and a diameter of 10 mm. The molding step was performed at 150 MPa at 200° C. with an injection velocity of 30 mm/s.

Example 2: Electrical Properties of the pMOV

The electrical properties of the varistor formed by the method described in Example 1 were tested.
Varistor Voltage (Vc)
The measured varistor voltage (Vc) of the pMOV of Example 1 was 130 V. As the calculated Vc of the pMOV of Example 1 is Vc=1000/8×3=375 V, it is evident that the pMOV has a varistor voltage that is close to ideal values. This measurement also shows that the Vc of pMOVs may be controlled by the board thickness of the pMOV as long as the ZnO particle diameter is constant.

Figure 6:
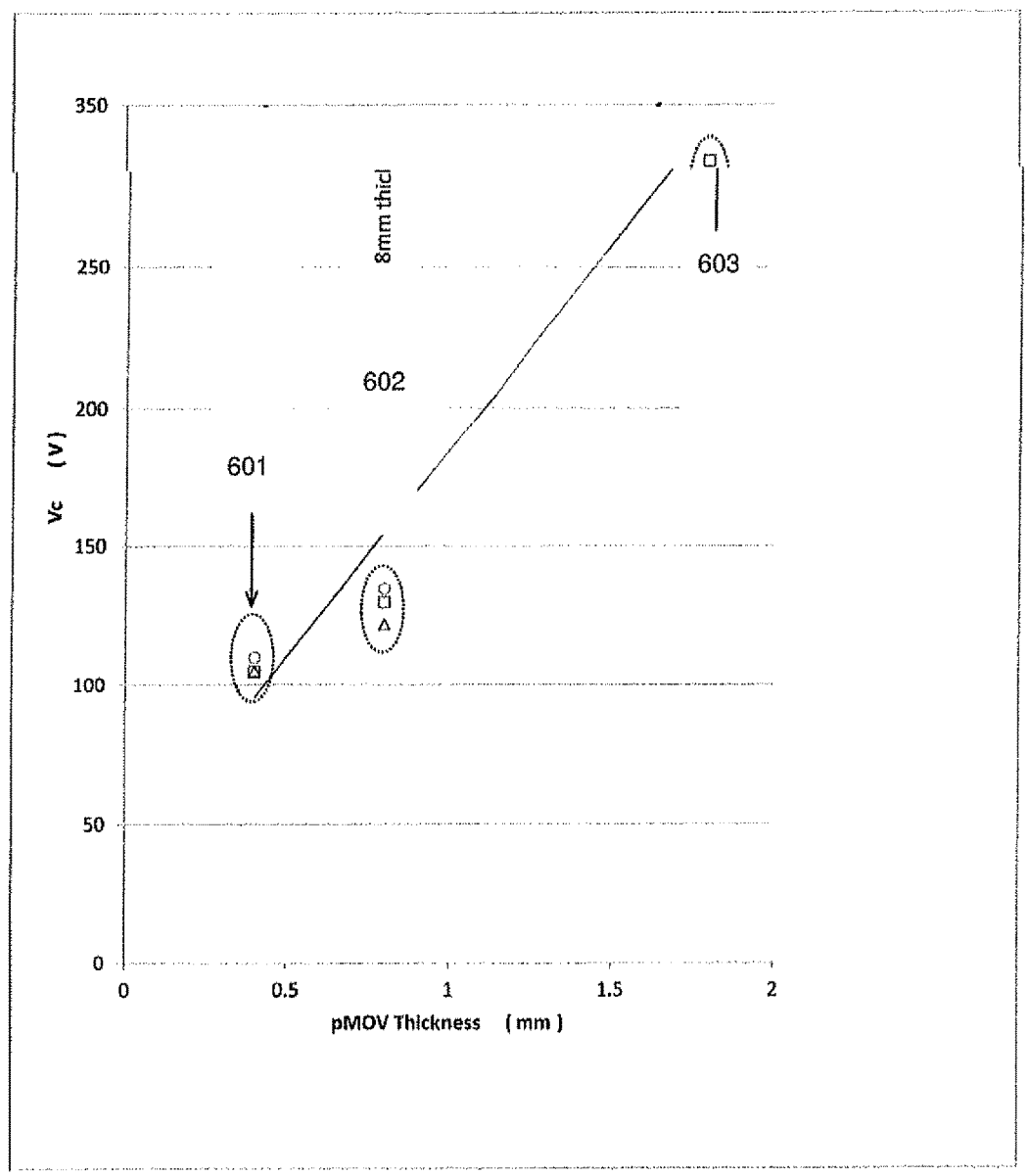
FIG. 6 is a graph showing the correlation between varistor voltage and the board thickness of the varistor.

This is further supported in FIG. 6. In FIG. 6, the varistor voltage of varistors having three different thicknesses, i.e. 0.4 mm (Sample 1) (601), 0.8 mm (Sample 2) (602) and 1.8 mm (Sample 3) (603), were measured. All samples contained 65 vol % ZnO in the resin. For each thickness, three samples were measured. It is evidenced that the Vc of pMOVs vary consistently with varistor thickness.
Impulse Waveshape
Further, to assess the property of the pMOV, the internationally recognised standard 8/20 μs test impulse waveshape experiment was performed. The varistor properties did not change after application of 50 pulses at 6 kV, and there were no signs of damage to the pMOV. In a comparative example using a conventional ceramic varistor, application of a single pulse at 4 kV destroyed the varistor. Without being bound by theory, it is believed that this difference in property between the pMOV and the conventional ceramic varistor is due to the pMOV having very little pores (less than 0.5 vol %) and due to the superior creep properties of the polyacetal resin.

Allowable Current

Figure 7:
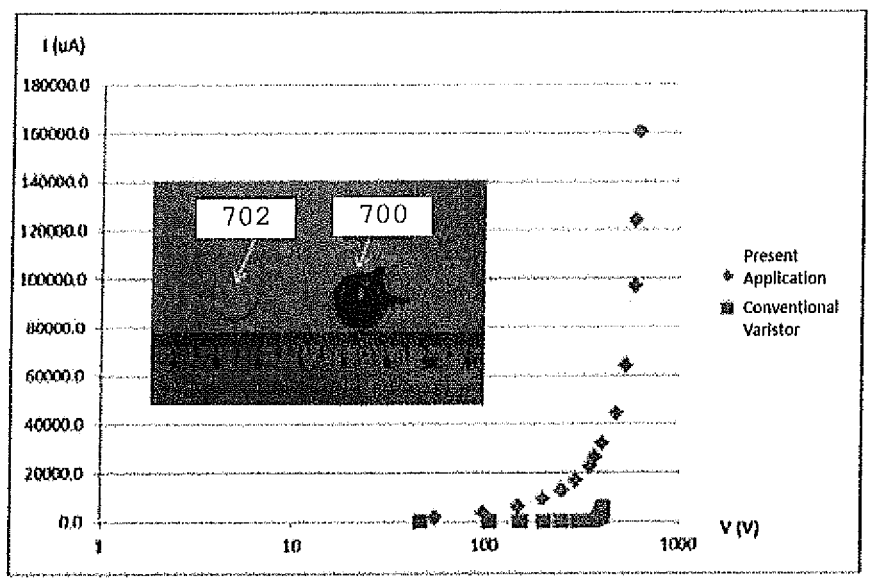
FIG. 7 is a graph comparing the voltage-current characteristics of the varistor according to an embodiment of the present application and a conventional ceramic varistor.

FIG. 7 shows the voltage-current characteristics of the pMOV synthesized in Example 1. Compared to a conventional ceramic varistor 700 having a similar shape and size (cross-sectional area), the pMOV 702 showed an allowable current that is 20 times higher. Further, the a value that shows the varistor performance was shown to be approximately 50, which is almost identical to an "ideal" conventional ceramic varistor having five other metal additives.

Figure 8:
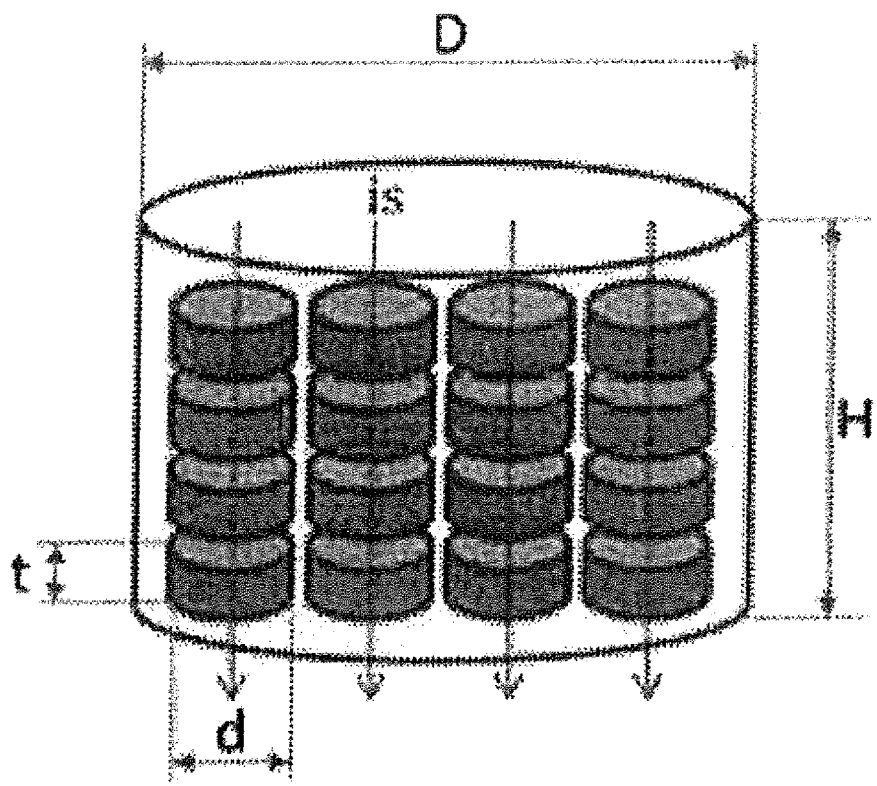
FIG. 8 is a schematic diagram showing a cross-section of the varistor according to an embodiment of the present application.

Without being bound to theory, if the ZnO particles are ideally arranged within a plane in an orderly manner, the number of current paths is thought to proportionally depend on the number of ZnO particles within the plane, as shown in FIG. 8. That is, the number of current paths would depend on the area of the horizontal plane of the compact.

The reason such a high allowable current and a value was observed for pMOV is believed to be due to the numerous current paths that exist, in addition to the fact there are very little pores that make the performance of the varistor unstable, and the use of polyacetal resin that has superior creep properties.

Further, the results shown in FIG. 7 also indicate that the application of the pMOV will enable manufacture of more compact varistors. If the varistor itself becomes more compact, then its application in mobile devices will also become possible.

Example 3

A varistor was formed by the method described in Example 1 and its electrical properties were compared against those of a known conventional ceramic MOV (Littelfuse® V251HB34). The comparison is shown in FIG. 11.

Accordingly, it is evident that, compared to a conventional ceramic varistor, the pMOV showed better electrical properties. Specifically, compared to a conventional ceramic varistor, the clamping (breakdown) voltage of the pMOV is lower, the surge withstand capability of the pMOV is 50% higher, the reliability is 10 times higher and the total number of surges that can be withstood is almost nine times higher.

Figure 9A:
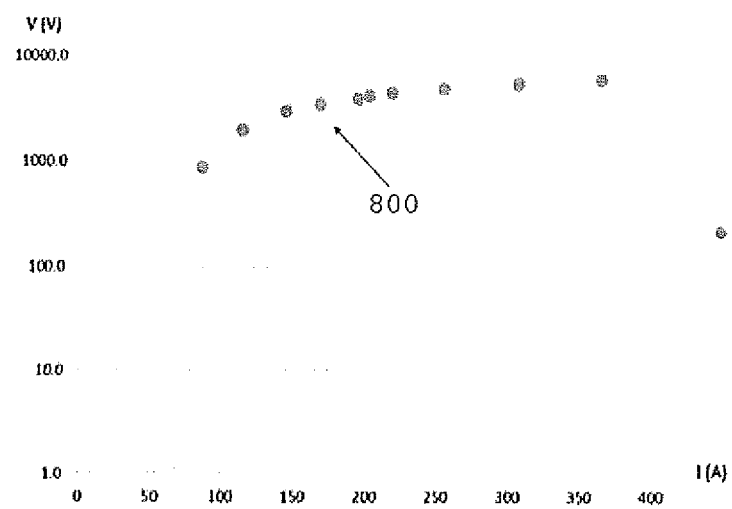
FIG. 9A is a graph showing the impulse voltage-current characteristics of the varistor of Example 3.
Figure 9B:
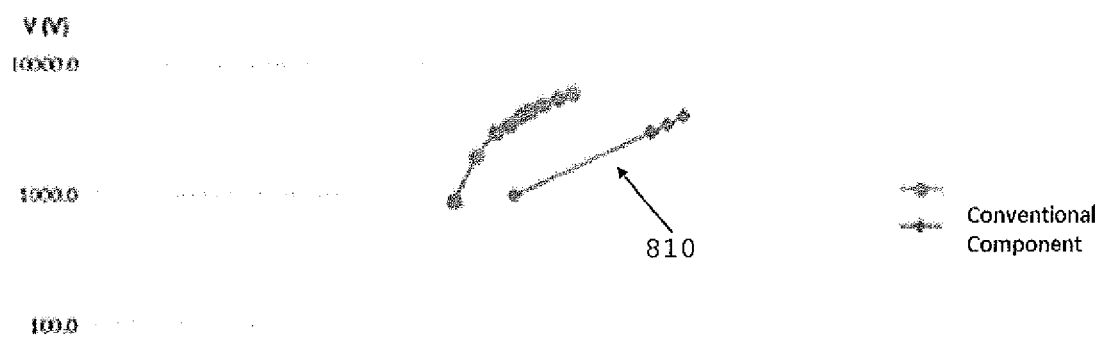
FIG. 9B is a graph showing the impulse voltage-current characteristics of the varistor of Example 3 compared with a conventional varistor component.

FIG. 9A shows the impulse voltage-current characteristics of the pMOV of this Example. The component shows a typical varistor effect, 800. FIG. 9B shows the impulse voltage-current characteristics of the pMOV of this Example 800 compared with a conventional varistor 810. The conventional varistor contains ZnO together with other metal oxides. As seen in FIG. 9B, the conventional varistor 810 did not show non-linear, varistor characteristics. Notably, the conventional varistor 810 did not show varistor characteristics after 1000 V, whereas the non-linear resistance property of the varistor 800 according to an embodiment of the present application was maintained.

Figure 10A:
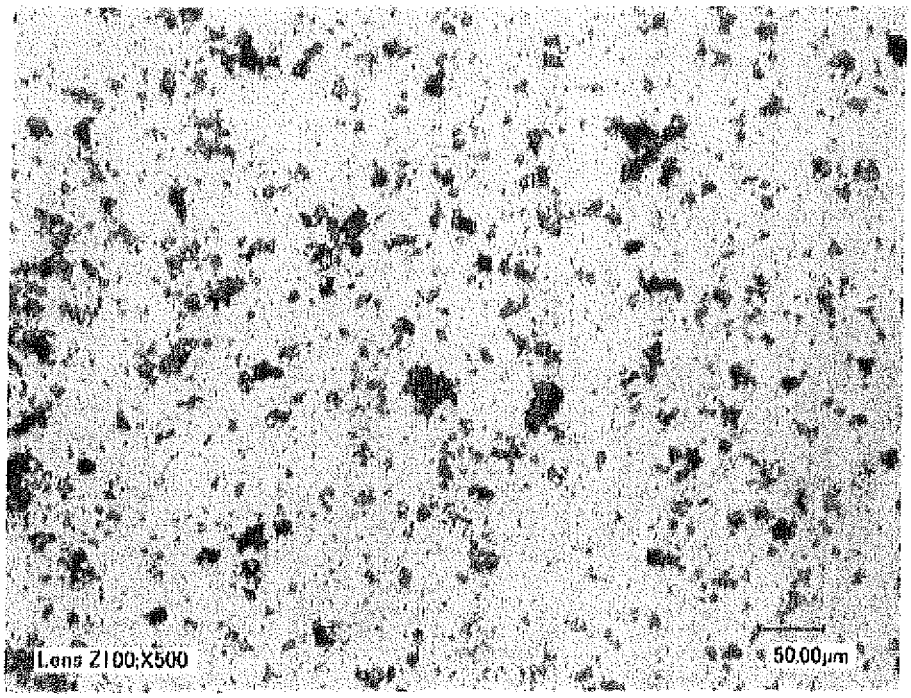
FIG. 10A is a micrographic image of the porosity of a conventional varistor component.
Figure 10B:
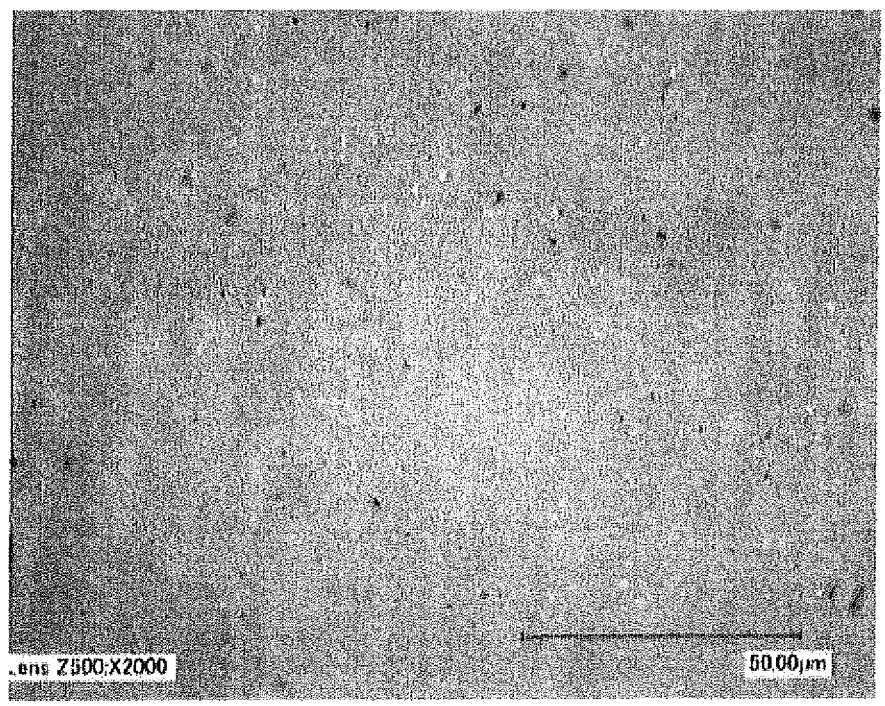
FIG. 10B is a micrographic image of the porosity of the varistor of Example 3.

FIG. 10A shows a micrograph of the porosity of a conventional varistor component, while FIG. 10B shows a micrograph of the porosity of the pMOV of this Example. The average porosity of the particles of the conventional varistor component is shown to be 11.41%, while that of the particles of the pMOV of this Example is shown to be 0.23%. Accordingly, the average porosity of the conventional varistor is almost 50 times more than that of a varistor according to an embodiment of the present application.

Further comparisons between the conventional MOV and the pMOV are tabulated below in Table 2.

TABLE 2

| Limitations of conventional MOVs | Advantages of pMOV |
|---|---|
| Bulky | Very small in size and thin |
| Higher clamping voltage | Lower clamping voltage |
| Non flexible | Flexible |
| Not suitable for direct microelectronics application (e.g. smart phone, laptop, tablet etc) | Suitable for direct microelectronics application (e.g. smart phone, laptop, tablet etc) |
| Higher manufacturing cost | Lower manufacturing cost |

Applications

The disclosed varistor may be substantially free of inorganic oxides other than zinc oxide. Therefore, costly and/or poisonous inorganic oxide additives may not be required in the disclosed varistor or in the fabrication of the disclosed varistor.

The disclosed method may exclude the step of sintering, which can be expensive and time consuming. The disclosed method is therefore advantageously simple and straightforward. Furthermore, due to the simple nature of the disclosed method, mass production of the disclosed varistor would be easier. In addition, the quality of the varistors produced by the disclosed method would be better and more consistent compared to conventional ceramic varistors that require a sintering step to produce. Without the step of sintering the ZnO with other metal additives, the particle size of ZnO may remain the same even after the mixing and/or heating steps of the disclosed method. Therefore, the disclosed varistor may comprise ZnO particles that are of a substantially uniform size and may be advantageously substantially homogeneously distributed within the resin.

It may be possible to use the disclosed pMOV in a wide range of applications, for example, to form thin-film varistors by applying it on the surface of a functional film or using 3-D printing technology to form 3-D varistors having different properties.

Further, the application of the pMOV may enable manufacture of more compact varistors. If the varistor itself becomes more compact, then its application in mobile devices will also become possible.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A varistor comprising a solid phase of zinc oxide particles substantially uniformly dispersed within a resin media, wherein the zinc oxide is present in the varistor in a range of 50 vol % to 80 vol %, wherein the ZnO or the varistor has not been sintered, and wherein the size of the zinc oxide particles is in a range of 1 μm to 50 μm.

2. The varistor of claim 1, wherein the zinc oxide particles are substantially free of inorganic oxides other than zinc oxide.

3. The varistor of claim 1, wherein the zinc oxide particles are of a substantially uniform size, wherein at least 80 to 99% of the zinc oxide particles are 1 μm to 50 μm in size.

4. The varistor of claim 1, wherein the resin is a thermoplastic polymer.

5. The varistor of claim 4, wherein the resin is selected from the group consisting of polystyrene, polyethylene, polypropylene, polyacetal, polymethyl acrylate, polycarbonate, polyamide, polytetrafluoroethylene, tetrafluoroethylene, perfluoroalkoxyethylene and any mixture thereof.

6. The varistor of claim 1, wherein the zinc oxide is present in the varistor in a range of 65 vol % to 70 vol %.

7. The varistor of claim 1, further comprising a pair of electrodes in contact with at least one surface of the varistor, wherein said at least one surface of the varistor comprises a coating applied thereon.

8. The varistor of claim 1, wherein the varistor has a porosity of less than 5%.

9. The varistor of claim 1, wherein the varistor has a thickness in the range of 0.1 mm to 5 mm.

10. A method of fabricating a varistor, comprising:
mixing a substantially homogenous mixture of solid zinc oxide particles and a resin media, wherein the zinc oxide is present in the mixture in a range of 50 vol % to 80 vol %;
heating the mixture under conditions to melt the resin and suspend the solid zinc oxide particles therein; and wherein a step of sintering is not performed; and wherein the size of the zinc oxide particles is in the range of 1 μm to 50 μm.

11. The method of claim 10, further comprising solidifying the molten resin to form a solid phase of zinc oxide particles substantially uniformly dispersed within the resin media.

12. The method of claim 10, wherein the zinc oxide particles are of a substantially uniform size, wherein at least 80 to 99% of the zinc oxide particles are 1 μm to 50 μm in size.

13. The method of claim 10, wherein the mixing step comprises kneading, wherein said kneading is performed at a kneading speed in the range of 100 rpm to 200 rpm; and wherein said mixing step is undertaken for a duration of from 0.5 to 2 hours.

14. The method of claim 10, further comprising a step of injection molding the mixture.

15. The method of claim 10, wherein the resin is a thermoplastic polymer.

16. The method according to claim 15, wherein the resin is selected from the group consisting of polystyrene, polyethylene, polypropylene, polyacetal, polymethyl acrylate, polycarbonate, polyamide, polytetrafluoroethylene, tetrafluoroethylene, perfluoroalkoxyethylene and any mixture thereof.

17. The method of claim 10, wherein the zinc oxide is present in the mixture in a range of 65 vol % to 70 vol %.

18. The method of claim 10, wherein the heating step is conducted at a temperature range of from 100° C. to 300° C.

* * * * *